(12) United States Patent
Chen et al.

(10) Patent No.: US 10,961,720 B1
(45) Date of Patent: Mar. 30, 2021

(54) STAND STRUCTURE FOR A DOUBLE-LAYER ELEVATED FLOOR

(71) Applicants: Yao-Chung Chen, New Taipei (TW); Shih-Jan Wang, Taipei (TW)

(72) Inventors: Yao-Chung Chen, New Taipei (TW); Shih-Jan Wang, Taipei (TW)

(*) Notice: Subject to any disclaimer, the term of this patent is extended or adjusted under 35 U.S.C. 154(b) by 0 days.

(21) Appl. No.: 16/803,052

(22) Filed: Feb. 27, 2020

(30) Foreign Application Priority Data

Jan. 6, 2020 (TW) ................................ 109200168

(51) Int. Cl.
E04F 15/024 (2006.01)
H02G 3/38 (2006.01)

(52) U.S. Cl.
CPC .... *E04F 15/0247* (2013.01); *E04F 15/02452* (2013.01); *H02G 3/385* (2013.01)

(58) Field of Classification Search
CPC . E04F 15/0247; E04F 15/02452; H02G 3/385
See application file for complete search history.

(56) References Cited

U.S. PATENT DOCUMENTS

| 4,630,417 A * | 12/1986 | Collier | F24F 7/10 |
| | | | 52/263 |
| 6,519,902 B1 * | 2/2003 | Scissom | E04F 15/02405 |
| | | | 52/126.4 |
| 8,528,274 B2 * | 9/2013 | Zlatar | E04F 15/0247 |
| | | | 52/126.6 |
| 8,555,579 B2 * | 10/2013 | Zlatar | E04B 5/43 |
| | | | 52/263 |
| 10,047,528 B1 * | 8/2018 | Kim | E04F 15/02458 |
| 2008/0141601 A1 * | 6/2008 | Mead | E04F 15/02452 |
| | | | 52/263 |
| 2010/0205874 A1 * | 8/2010 | Zlatar | E04F 15/02429 |
| | | | 52/126.6 |
| 2013/0034409 A1 * | 2/2013 | Haworth | F16C 1/226 |
| | | | 411/538 |
| 2016/0348831 A1 * | 12/2016 | Dombrowski | E04F 15/02464 |
| 2018/0195293 A1 * | 7/2018 | Marchetti | E04F 15/02405 |

FOREIGN PATENT DOCUMENTS

GB 2036847 A * 7/1980 ............ E04F 15/024

* cited by examiner

*Primary Examiner* — Patrick J Maestri
(74) *Attorney, Agent, or Firm* — Muncy, Geissler, Olds & Lowe, P.C.

(57) ABSTRACT

The present invention provides a stand structure for a double-layer elevated floor, comprising: a stand, a T-shaped seat, a supporting block and a base plate. The stand is provided on a ground and has a hollow sleeve. The T-shaped seat includes a supporting plate and a screw formed below the supporting plate, where the screw is movably combined with a nut, such that when the screw is placed in the hollow sleeve, the T-shaped seat is adjusted by the nut to be at an upper position or a lower position on the stand. The supporting block is provided above the supporting plate. The base plate provided above the supporting block. A fixing seat is respectively provided at each corner of the base plate. Each fixing seat is used for accommodating and fixing one of supporting stands of plurality of elevated floor units.

3 Claims, 4 Drawing Sheets

STAND STRUCTURE FOR A DOUBLE-LAYER ELEVATED FLOOR

FIELD OF THE INVENTION

The present invention is related to a stand structure for a double-layer elevated floor with a simple structure and low cost, and a space that can be effectively used, so as to provide diversions of pipelines/lines and simple arrangements of pipelines/lines.

BACKGROUND OF THE INVENTION

In recent years, for workplaces where computers are widely used, the connection and wiring of network lines and other pipelines/lines are very important and necessary. Since each computer must be connected with other computers through the networks and is connected electrically with power, when the amount of machineries and devices is large, the pipeline/line arrangement becomes more complicated. When the pipelines or lines are exposed to the outside, it is not only unsightly, but also impedes the movement of people. Network floors can be erected to be elevated, leaving a space through which for pipelines/lines/to pass under the network floors, and the number of network floors to be laid on can be flexibly determined in accordance with the size of the indoor space, which not only becomes the mainstream of modern information-based offices, but is also often used in homes or public places.

In the above design of the stand for an elevated floor, the pipelines/lines are hidden under the elevated floor and there is no design about diversion/division, that is, all lines, such as power lines, telephone lines, network lines and other power or signal lines are mixed together. For example, especially in countries where under-floor air conditioning (UFAD) is popular, such as in the United States and Canada, larger pipelines, such as condenser pipes, hot water pipes, water pipes or gas pipes, are placed under the elevated floors, which makes the pipelines or lines under the elevated floor are even more chaotic. Moreover, installations, maintenances and even removals for these pipelines and lines are very troublesome and inconvenient for the construction personnel to arrange various pipelines or lines.

SUMMARY OF THE INVENTION

In view of this, in order to provide a structure different from prior art and to improve the above disadvantages, the inventor has continuously researched to make developments, and the present invention is thus invented.

The main object of the present invention is to provide a stand structure for a double-layer elevated floor that is structurally simple and making effective use of its space, so as to provide diversions of pipelines/lines and simple pipeline/line arrangements.

The secondary object of the present invention is to provide a stand structure for a double-layer elevated floor with properties of low-cost, low-inventory and higher loading.

In order to fulfill above objects, the present invention provides a stand structure for a double-layer elevated floor stand structure for a double-layer elevated floor, comprising: a stand, a T-shaped seat, a supporting block and a base plate. The stand is provided on a ground and has a hollow sleeve. The T-shaped seat includes a supporting plate and a screw formed below the supporting plate, where the screw is movably combined with a nut, such that when the screw is placed in the hollow sleeve, the T-shaped seat is adjusted by the nut to be at an upper position and or a lower position on the stand. The supporting block is provided above the supporting plate. The base plate provided above the supporting block. A fixing seat is respectively provided at each corner of the base plate. Each fixing seat is used for accommodating and fixing one of supporting stands of plurality of elevated floor units, such that an upper-layer wiring space is formed between one elevated floor unit and the base plate, and a lower-layer wiring space is formed between the supporting plate below the base plate and the ground.

In an implementation, the supporting block is a cross-shaped block, and each fixing seat is correspondingly provided on the base plate above the cross-shaped block.

In an implementation, the fixing seat is an annular body, and is provided with a positioning screw, such that when one supporting stand of the elevated floor unit is accommodated in one fixing seat, the positioning screw is forced to make the supporting stand securely accommodated in each fixing seat.

The present invention will be understood more fully by reference to the detailed description of the drawings and the preferred embodiments below. In order to deeply understand the present invention, the embodiments of the present invention are described below.

DETAILED DESCRIPTIONS OF PREFERRED EMBODIMENTS

Please refer to FIGS. 1 to 4, which show a stand structure for a double-layer elevated floor in the embodiment of the present invention, comprising: a stand 1, a T-shaped seat 2, a supporting block 3, and a base plate 4.

Figure 1:
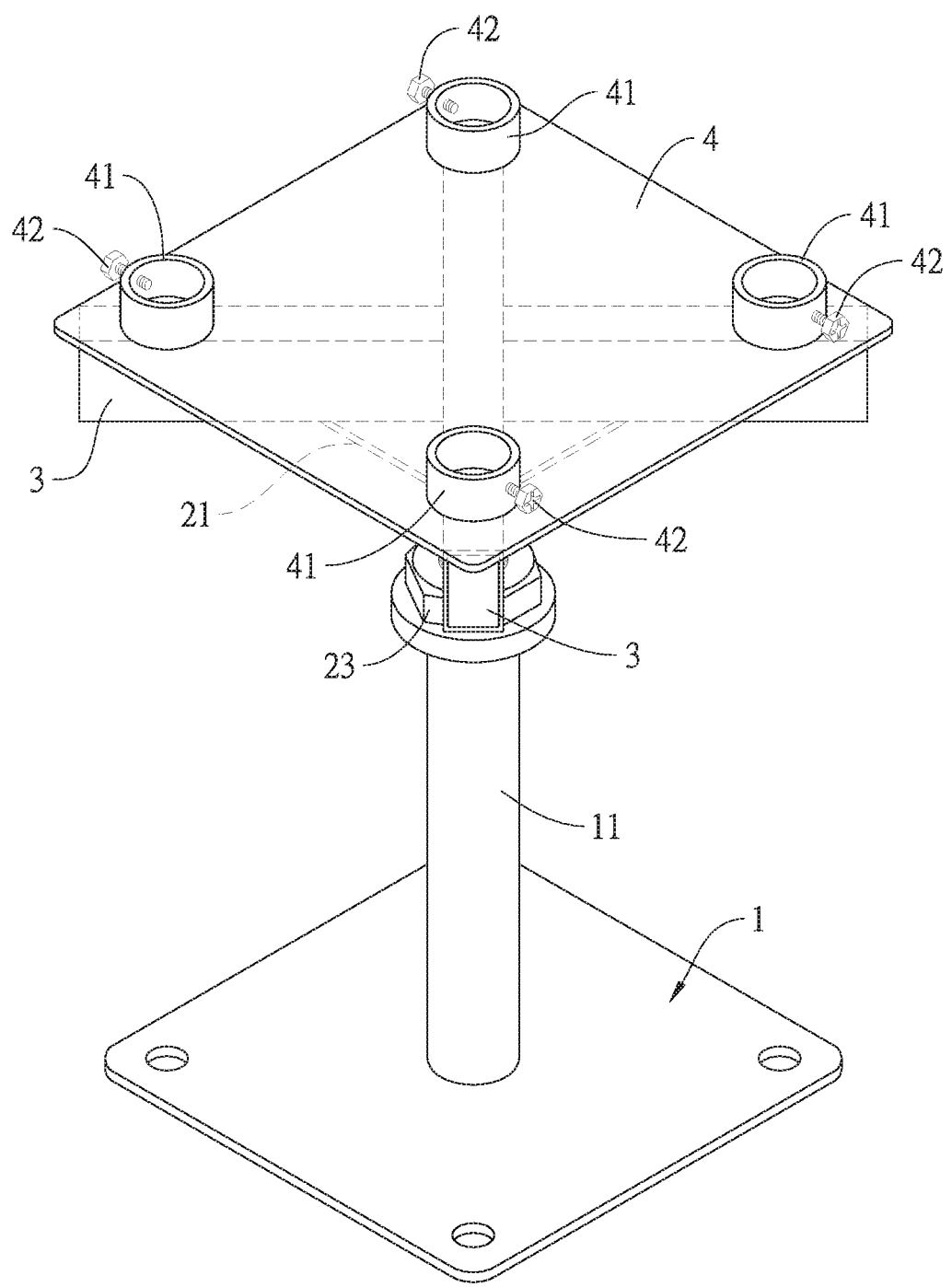
FIG. 1 is a schematic diagram showing an embodiment of the stand structure of the double-layer elevated floor of the present invention.
Figure 2:
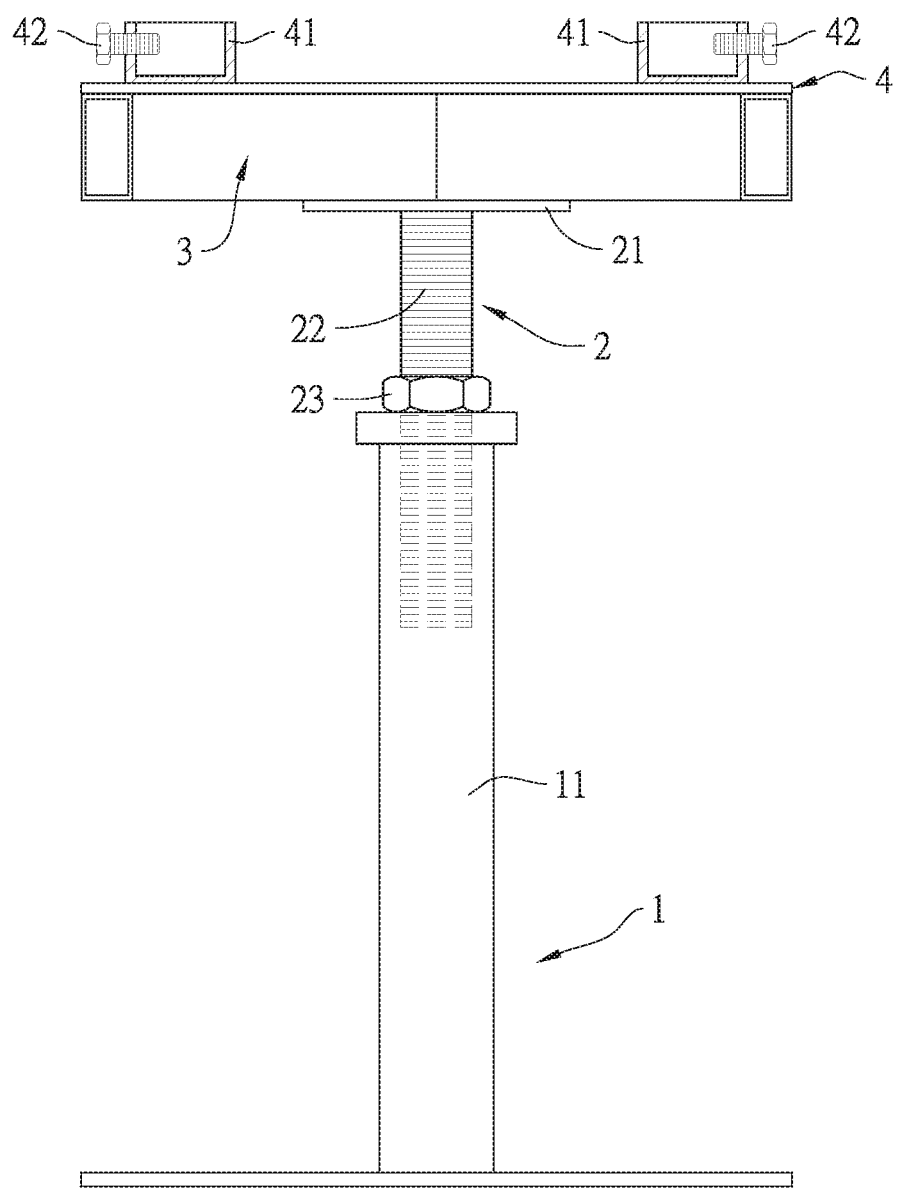
FIG. 2 is a schematic diagram showing the lateral appearance of the embodiment of the stand structure for a double-layer elevated floor of the present invention.

As shown in FIGS. 1 and 2, the stand 1 is provided on the ground, and the stand 1 has a hollow sleeve 11.

The T-shaped seat includes a supporting plate 21 and a screw 22 formed below the supporting plate 21, where the screw 22 is movably combined with a nut 23, such that when the screw 22 is placed in the hollow sleeve 11, the T-shaped seat 2 is able to be adjusted by the nut 23 to be at an upper or a lower positions on the stand 1.

The supporting block 3 is a cross-shaped block and is provided above the supporting plate 21.

The base plate 4 is provided above the supporting block 3, and a fixing seat 41 is respectively provided at each corner of the base plate 4. The fixing seat 41 is an annular body and is correspondingly provided on the base plate 4 above the cross-shaped block (the supporting block 3). Each fixing seat 41 is used for accommodating and fixing one of supporting stands 51 of different elevated floor units 5.

Figure 3:
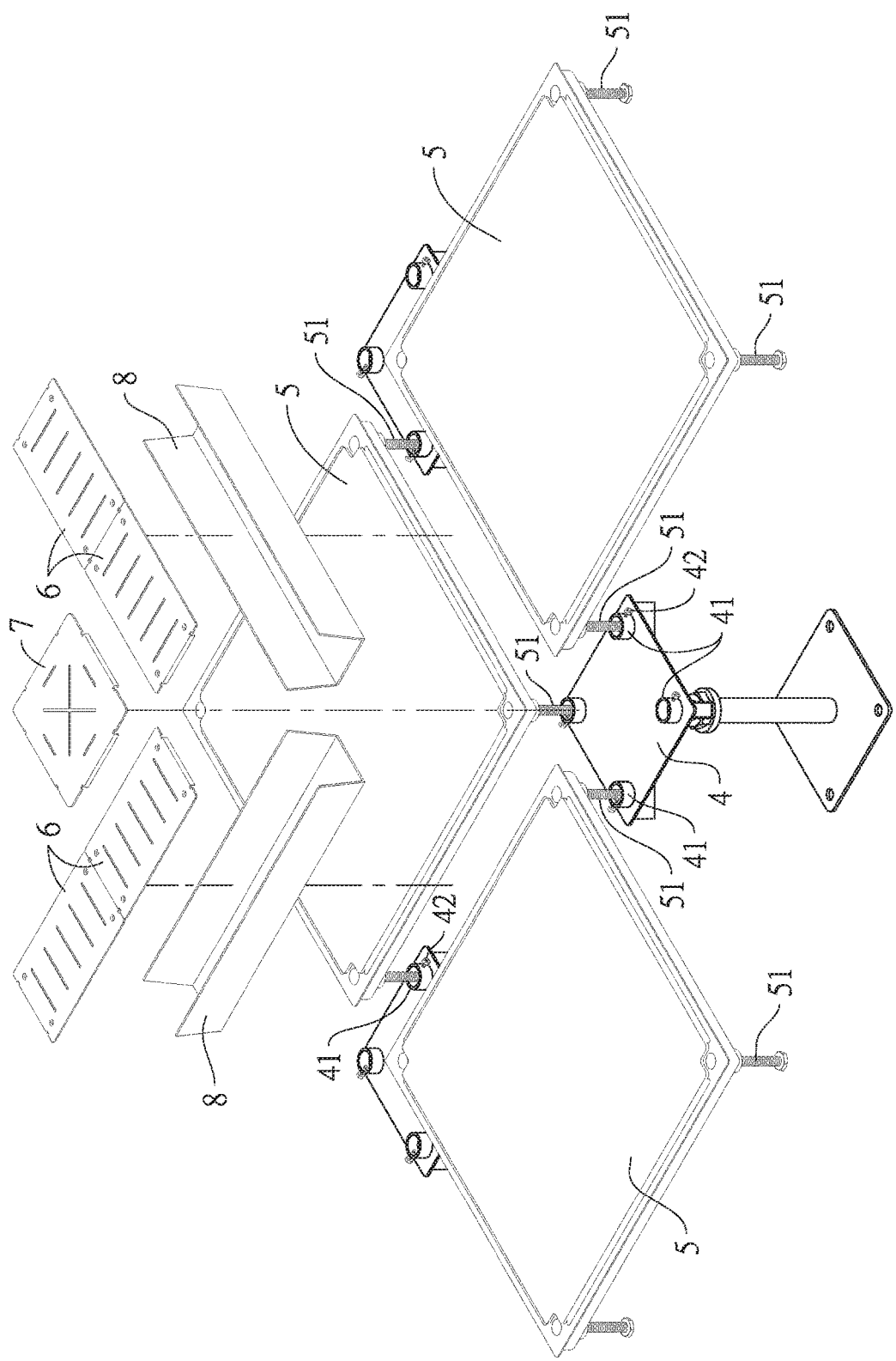
FIG. 3 is a schematic diagram showing an embodiment of the stand structure for a double-layer elevated floor when being combined with the elevated floor unit of the present invention.
Figure 4:
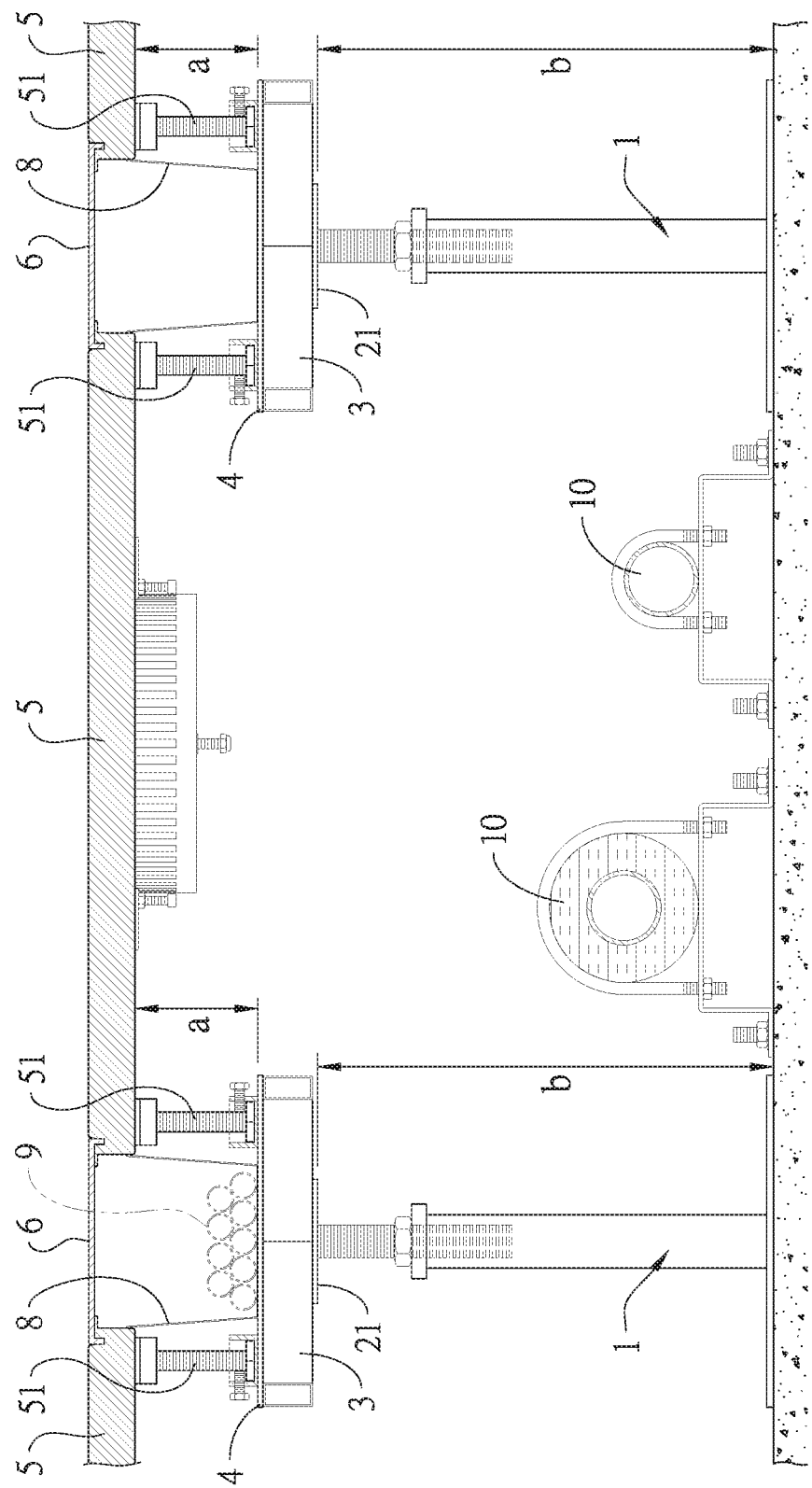
FIG. 4 is a schematic diagram showing an embodiment of the stand structure of the double-layer elevated floor of the present invention under the elevated floor unit after assembling.

Moreover, the fixing seat 41 is provided with a positioning screw 42, such that when the supporting stand 51 of the elevated floor unit 5 is accommodated in the fixing seat 41, the positioning screw 42 is forced to make the supporting stand 51 securely accommodated in each fixing seat 41 as shown in FIGS. 3 and 4.

Therefore, by such arrangement, as shown in FIG. 4, an upper-layer wiring space a is formed between an elevated floor unit 5 and the base plate 4, and a lower-layer wiring space b is formed between the supporting plate 21 below the base plate 4 and the ground.

Therefore, in an implementation, when a plurality of stand structure for a double-layer elevated floor is sequentially laid on the ground, one of the four supporting stands 51 of the elevated floor unit 5 is accommodated and fixed in one fixing seat 41, and the positioning screw 42 on the fixing seat 41 is forced to make the supporting stand 51 securely accommodated in the fixing seat 41. As a result, as shown in FIGS. 3 and 4, each fixing seats 41 provided on each corner of the base plate 4 supports one supporting stand 51 of the elevated floor unit 5, and each elevated floor unit 5 can be connected adjacently to each other by connecting a cover plate 6 with a central cover plate 7. After the stand 1 of the present invention is combined with the elevated floor unit 5, an upper-layer wiring space a can be formed between the elevated floor unit 5 and the base plate 4, and the upper-layer wiring space a can be placed therein with a wire slot seat 8 for being provided with small-scale lines 9 that are more usually moved, replaced or repaired, such as network lines, power lines, signal lines and so on. The lower-layer wiring space b is formed between the supporting plate 21 under the base plate 4 and the ground for large-scale pipelines 10, such as condenser pipes, hot water pipes, water pipelines, or gas pipes to be accommodated therein shown as FIG. 4.

Thus, the present invention has following advantage:

1. An upper-layer wiring space and a lower-layer wiring space can be formed below the elevated floor unit by the design of the stand structure for a double-layer elevated floor of the present invention, so as to fulfill the purpose of dividing pipelines or lines, such that all pipelines and/or lines under the elevated floor are arranged in order, and it is more convenient for users to replace or maintain pipelines or lines, so to reduce time cost and improve efficiency.
2. A mesh-shaped passage is formed under the elevated floor by the stand structure for a double-layer elevated floor of the present invention, such that small-scale pipelines or lines, such as network lines, electrical wires, and signal lines, can be stably allocated and arranged in the upper-layer wiring space, such that construction workers only need to open the connection cover and the central cover to perform construction or maintenance of these pipelines or lines, which is very convenient.
3. The present invention is able to form a double layer through the base plate to provide the overall loading that can be effectively increased through the arrangement of the supporting block, so as to provide better supporting and loading in use.
4. Although the design of the stand structure for a double-layer elevated floor of the present invention is different from the wiring method for all elevated floors in prior art. Nevertheless, some components, such as stands and base plates, is similar to those in prior art. Therefore, for existing conventional elevated floor sellers or in places that has already used conventional elevated floors, it is convenient to upgrade their floors to be the stand structure for a double-layer elevated floor of the present invention without completely replacing or removing their floors. It is able to provide the double-layer floor having the structure of the present invention and reduce the cost and inventory, and it is able to solve the problem of waste materials and produce environmental protective effects.

To sum up, as disclosed in the above description and attached drawings, the present invention can provide a stand structure for a double-layer elevated floor. It is new and can be put into industrial use.

The description referred to in the drawings and stated above is only for the preferred embodiments of the present invention. Many equivalent local variations and modifications can still be made by those skilled at the field related with the present invention and do not depart from the spirit of the present invention, so they should be regarded to fall into the scope defined by the appended claims

What is claimed is:

1. A stand structure for a double-layer elevated floor, comprising:
   a stand, for being provided on a ground and having a hollow sleeve;
   a T-shaped seat, including a supporting plate and a screw formed below the supporting plate, where the screw is movably combined with a nut, such that when the screw is placed in the hollow sleeve, the T-shaped seat is adjusted by the nut to be at an upper position or a lower position on the stand;
   a supporting block, provided above the supporting plate; and
   a base plate, provided above the supporting block, and a fixing seat is respectively provided at each corner of the base plate, and each fixing seat is used for accommodating and fixing one of supporting stands of plurality of elevated floor units, such that an upper-layer wiring space is formed between one elevated floor unit and the base plate, and a lower-layer wiring space is formed between the supporting plate below the base plate and the ground.

2. The stand structure for a double-layer elevated floor of claim 1, wherein the supporting block is a cross-shaped block, and each fixing seat is correspondingly provided on the base plate above the cross-shaped block.

3. The stand structure for a double-layer elevated floor of claim 2, wherein the fixing seat is an annular body, and is provided with a positioning screw, such that when one supporting stand of the elevated floor unit is accommodated in one fixing seat, the positioning screw is forced to make the supporting stand securely accommodated in each fixing seat.

* * * * *